US010260927B2

(12) United States Patent
Jackson et al.

(10) Patent No.: US 10,260,927 B2
(45) Date of Patent: Apr. 16, 2019

(54) METHOD AND SYSTEM OF SENSING LEVEL OF SUBMERGED SOLIDS

(71) Applicant: Cotton Picking Mind, LP, Lubbock, TX (US)

(72) Inventors: S. Christopher Jackson, Lubbock, TX (US); Jeremy J. Osborne, Lubbock, TX (US)

(73) Assignee: Cotton Picking Mind, LP, Lubbock, TX (US)

( * ) Notice: Subject to any disclaimer, the term of this patent is extended or adjusted under 35 U.S.C. 154(b) by 0 days.

(21) Appl. No.: 15/897,516

(22) Filed: Feb. 15, 2018

(65) Prior Publication Data

US 2019/0063979 A1 Feb. 28, 2019

Related U.S. Application Data

(60) Provisional application No. 62/550,424, filed on Aug. 25, 2017.

(51) Int. Cl.
*G01F 23/22* (2006.01)
*C02F 5/00* (2006.01)

(52) U.S. Cl.
CPC ............ *G01F 23/223* (2013.01); *C02F 5/00* (2013.01); *C02F 2209/10* (2013.01)

(58) Field of Classification Search
None
See application file for complete search history.

(56) References Cited

U.S. PATENT DOCUMENTS

| 4,019,659 | A | | 4/1977 | Deneen | |
|---|---|---|---|---|---|
| 4,139,750 | A | | 2/1979 | Rau | |
| 4,917,794 | A | | 4/1990 | Fettes et al. | |
| 5,147,531 | A | | 9/1992 | Dougal | |
| 5,239,285 | A | | 8/1993 | Rak | |
| 5,297,428 | A | * | 3/1994 | Carr | G01F 23/44 210/86 |
| 5,363,087 | A | * | 11/1994 | Johannsen | C02F 1/42 210/85 |
| 6,309,551 | B1 | * | 10/2001 | Suchecki, Jr. | B01F 1/0027 137/268 |
| 6,380,499 | B1 | | 4/2002 | Edwards | |

(Continued)

FOREIGN PATENT DOCUMENTS

DE 102009024998 A1 12/2010

*Primary Examiner* — Chico A Foxx
(74) *Attorney, Agent, or Firm* — Dickinson Wright PLLC; Mark E. Scott

(57) ABSTRACT

Sensing level of submerged solids. At least some of the example embodiments are methods including: inserting a level sensing apparatus through an aperture at a top of a reservoir such that a bottom end of an inner tube abuts an upper surface of the submerged solids in the reservoir; utilizing the submerged solids such that the upper surface of the submerged solids recedes and the level sensing apparatus moves downward with the receding upper surface of the submerged solids; constraining downward movement of an outer tube when the upper surface of the submerged solids reaches a predetermined low level; and as the upper surface of the submerged solids continues to recede, sensing relative movement of the outer tube and an inner tube as an indication that the upper surface of the submerged solids is below the predetermined low level.

17 Claims, 5 Drawing Sheets

(56) References Cited

U.S. PATENT DOCUMENTS

| | | | |
|---|---|---|---|
| 6,696,966 B2 | 2/2004 | Bearak | |
| 7,030,768 B2 * | 4/2006 | Wanie | G01F 23/603 |
| | | | 340/612 |
| 7,722,772 B2 * | 5/2010 | Furukawa | C02F 1/42 |
| | | | 210/191 |
| 7,949,747 B1 * | 5/2011 | Van Oosterwijck | H04Q 9/00 |
| | | | 370/311 |
| 8,180,489 B2 * | 5/2012 | Quinn | C02F 1/008 |
| | | | 340/500 |
| 9,533,902 B2 | 1/2017 | Yamaoka | |
| 9,791,308 B2 * | 10/2017 | Pesz | G01F 23/0007 |
| 2002/0170354 A1 | 11/2002 | Monsrud et al. | |
| 2015/0218026 A1 * | 8/2015 | Yamaoka | B01J 49/00 |
| | | | 210/123 |

\* cited by examiner

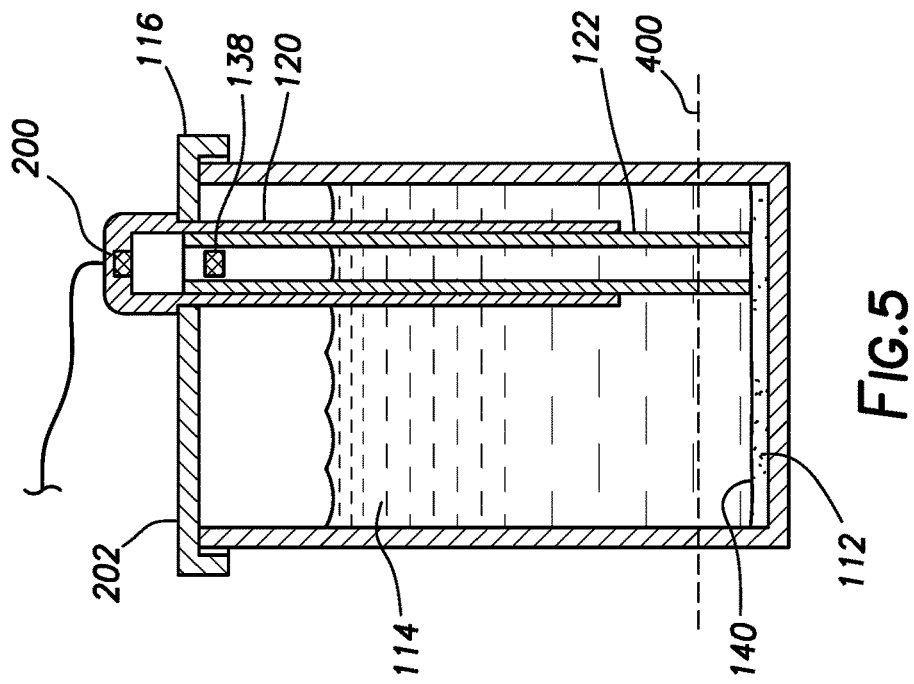
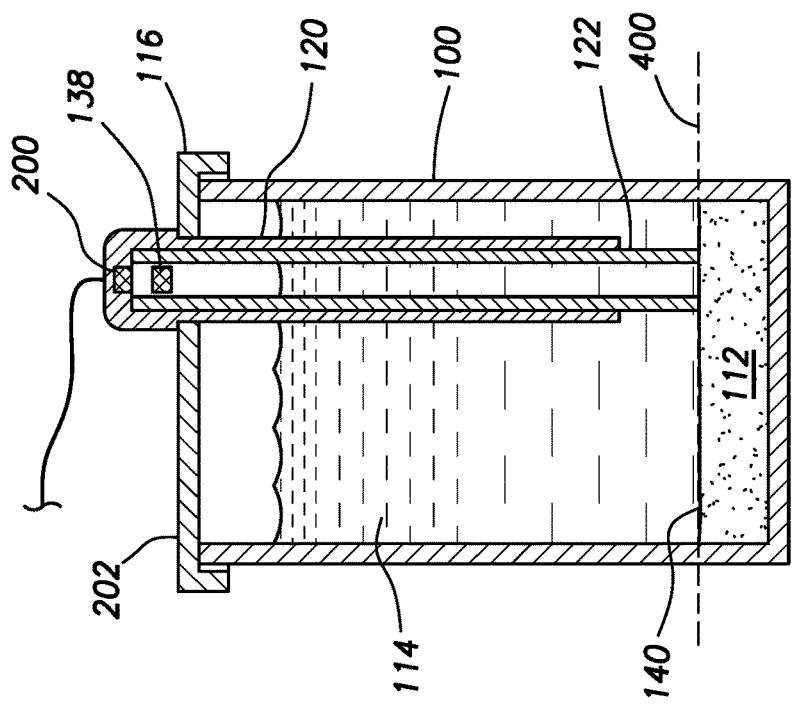

METHOD AND SYSTEM OF SENSING LEVEL OF SUBMERGED SOLIDS

CROSS-REFERENCE TO RELATED APPLICATIONS

This application claims the benefit of provisional application Ser. No. 62/550,424 filed Aug. 25, 2017 and titled "Method and System of Salt Level Sensing." The provisional application is incorporated by reference herein as if reproduced in full below.

BACKGROUND

Level sensing of submerged solids in salt water can be a difficult task. Non-contact level sensing (e.g., capacitive, ultrasonic) is subject to error and false readings based not only on corrosion of electronic devices in the salty environment, but also salt deposits on the walls and exposed sensing elements. Any system and/or method that provides a reliable mechanism to detect or sense the level of submerged solids in salt water would provide a competitive advantage in the marketplace.

BRIEF DESCRIPTION OF THE DRAWINGS

For a detailed description of example embodiments, reference will now be made to the accompanying drawings in which:

FIG. 4 shows a side elevation, cross-sectional, view of a level sensing system in accordance with at least some embodiments;

FIG. 5 shows a side elevation, cross-sectional, view of a level sensing system in accordance with at least some embodiments;

NOTATION AND NOMENCLATURE

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to methods and systems of sensing level of submerged solids or solid substances in a reservoir. More particularly, various embodiments are directed to sensing level of submerged solids by sensing relative movement of components of a level sensing apparatus whose lower end is itself submerged and in contact with an upper surface of the submerged solids. The various embodiments were developed in the context of sensing the level of salt pellets submerged in water within a reservoir being part of a water softening system. When the salt water from the reservoir is used to regenerate the water softener, the reservoir is replenished with fresh water. The fresh water dissolves the portions of the salt pellets to again create salt water, and thus the volume of undissolved salt is reduced. The description that follows regarding sensing of level of submerged solids is based on the developmental context; however, the developmental context shall not be read as a limitation on the applicability of the various devices and methods.

Figure 1:
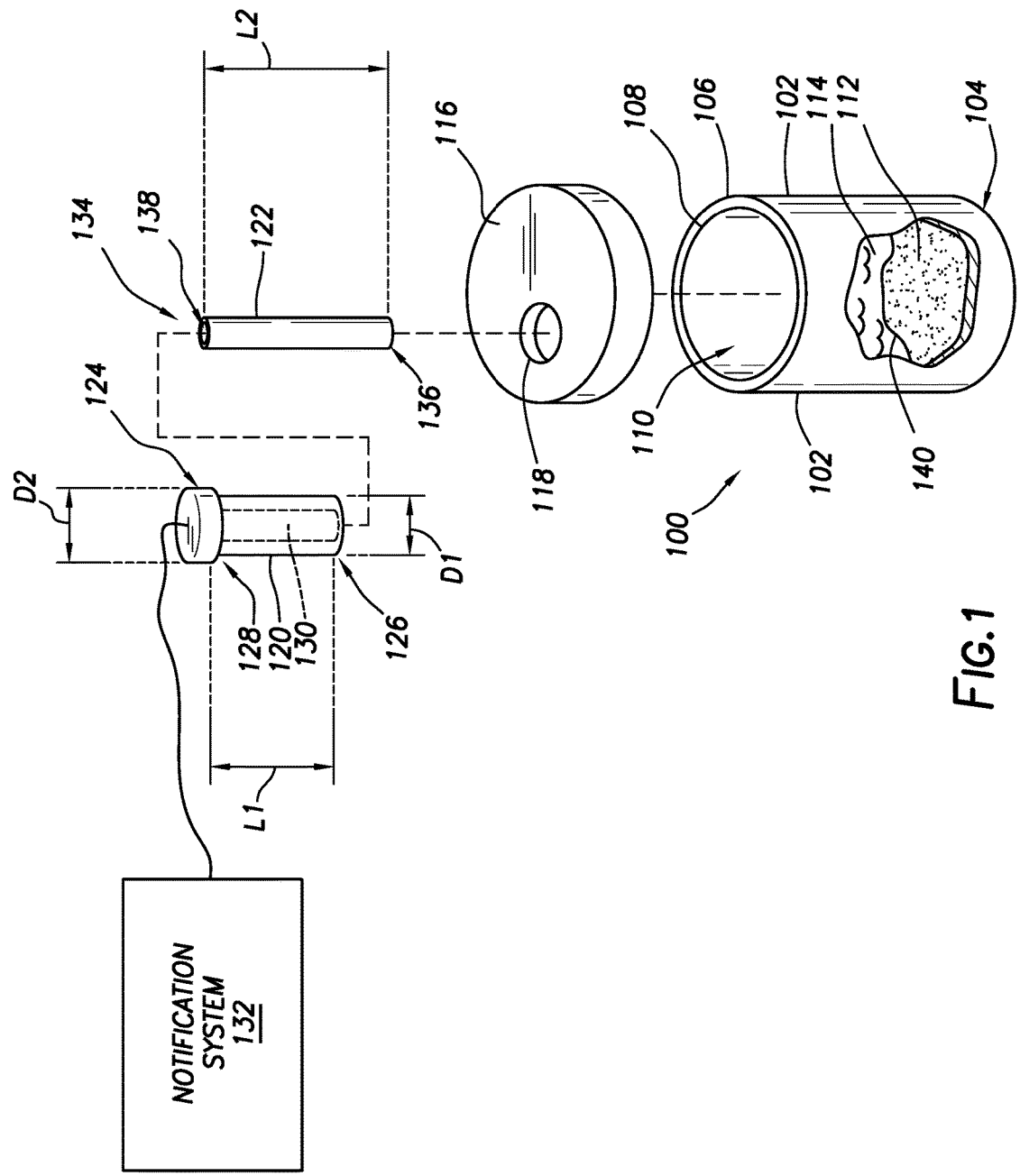
FIG. 1 shows an exploded perspective, partial cutaway, view of a level sensing system in accordance with at least some embodiments.

FIG. 1 shows an exploded-perspective, partial cutaway, view of level sensing system in accordance with at least some embodiments. In particular, visible in FIG. 1 is a tank or reservoir 100. The reservoir 100 has side walls 102, a closed bottom 104, and a top 106 with an aperture 108 into an interior volume 110. The example reservoir 100 has a circular cross-section; however, the reservoir may take any suitable shape. Visible through the cutaway in the sidewall 102 are submerged solids 112, such as salt pellets submerged within water 114. In some example systems, the top 106 of the reservoir 100 is associated with a retention device 116 having an aperture 118 defined through the retention device 116. In the example system of FIG. 1 the retention device 116 is shown in the form of a lid that telescopes over the top 106 of the reservoir and fully occludes the aperture 108 (with the exception of the area defined by the aperture 118). In other example embodiments, the retention device may only partially occlude the aperture 108 into the interior volume 110. Hereafter the retention device 116 will be referred to as a lid 116 with the understanding that a full lid need not be used as the retention device.

The level sensing system includes a level sensing apparatus comprising two tubes—an outer tube 120 and an inner tube 122. In particular, the outer tube 120 comprises an upper or first end 124 and a lower or second end 126 opposite the first end 124. The example outer tube 120 has a first diameter D1 and a second diameter D2, where the first diameter D1 is smaller than the second diameter D2. A shoulder region 128 is defined at the intersection of the first diameter D1 and second diameter D2. In example embodiments, the first diameter D1 is smaller than an inside diameter of the aperture 118 through the lid 116, while the second diameter D2 is larger than the inside diameter of the aperture 118. The outer tube 120 defines a length L1 measured between the shoulder region 128 and the second end 126. The outer tube 120 further comprises an interior volume 130 (not directly visible in FIG. 1, but shown in dashed lines). In example systems, the outer tube 120 comprises a PVC pipe or tube with a PVC cap glued to one end thereof. Thus, the outside diameter of the PVC tube defines the first diameter D1, and the outside diameter of the cap defines the second diameter D2. However, other components may be used to construct the outer tube 120, including devices that do not have circular cross-sections. As will be discussed in greater detail below, in example systems a switch device is disposed or enclosed at the first end 124 (e.g., disposed or enclosed within the cap), and the switch device is communicatively coupled to a notification system 132.

Still referring to FIG. 1, inner tube 122 defines an upper end 134, a lower end 136, and length L2 between the upper end 134 and lower end 136. The example inner tube 122 has an actuation device 138 disposed at the upper end 134. In systems where the switch device associated with the outer tube 120 is a reed switch, the actuation device 138 may be a magnet disposed at the upper end 134. In systems where interior volume 130 of the outer tube 120 is circular, the outside surface of the inner tube 122 is likewise circular and has an outside diameter slightly smaller than the inside diameter of the outer tube 120 such that the inner tube 122 telescopes within or slidingly engages with the interior volume of the outer tube 120. Stated slightly differently, the outer tube 120 defines a long central axis, the inner tube defines a long central axis, and when telescoped together the two axes are coaxial and the inner tube 122 can move coaxially with respect to the outer tube 120. In example systems, the inner tube 122 comprises a PVC pipe or tube, but other materials may be used, and the material of the inner tube 122 need not be the same as the material of the outer tube 120. Other components may be used to construct the inner tube 122, including devices that do not have circular cross-sections (so long as the internal cross-sectional shape of the outer tube 120 corresponds).

Figure 2:
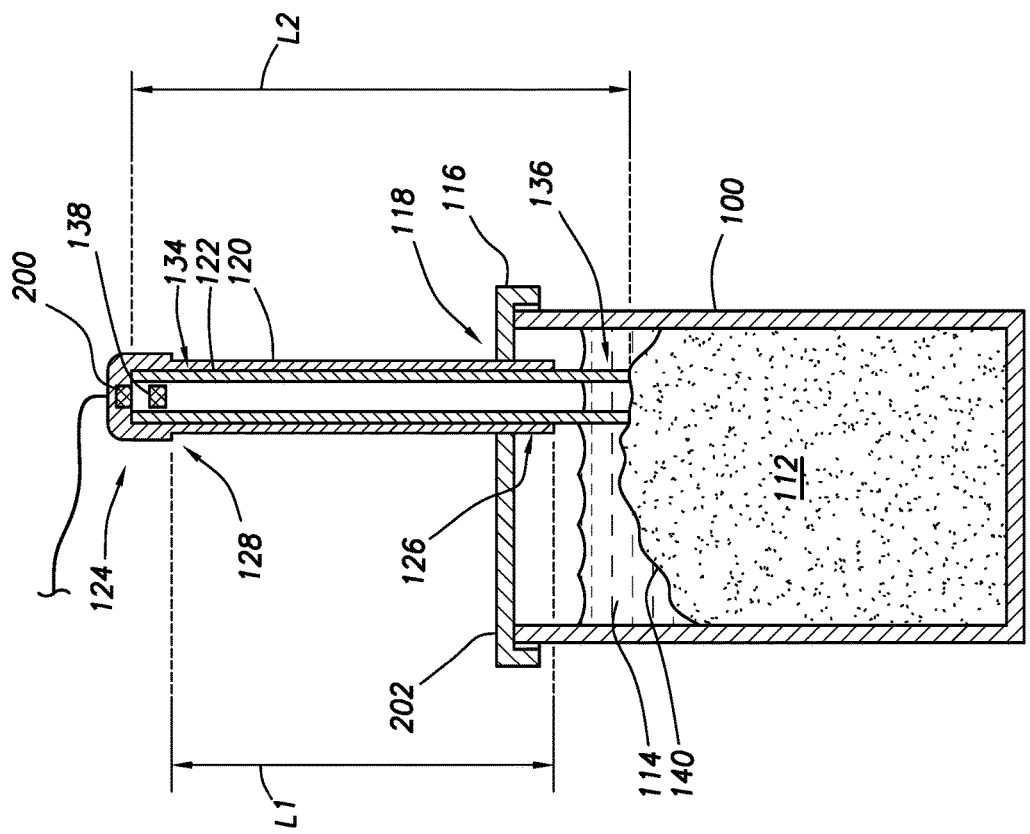
FIG. 2 shows a side elevation, cross-sectional, view of a level sensing system in accordance with at least some embodiments.

FIG. 2 shows a cross-sectional view of the level sensing system in accordance with at least some embodiments. In particular, visible in FIG. 2 is the reservoir 100 containing water 114 and submerged solids 112. The submerged solids 112 define an upper surface 140. The reservoir 100 has the lid 116 installed. The inner tube 122 is telescoped within the outer tube 120, and the actuation device 138 is in operational relationship to a switch device 200 (e.g., a reed switch) disposed at the first end 124 of the outer tube 120. Better visible in the view of FIG. 2 is the shoulder region 128 of the outer tube 120. The combined outer tube 120 and inner tube 122 are telescoped through the aperture 118, and the lower end 136 of the inner tube 122 abuts the upper surface 140 of the submerged solids 112. In the example system shown, the length L1 of the outer tube 120 is shorter than the length L2 of the inner tube 122 such that the inner tube 122 extends beyond the second end 126 of the outer tube 120.

FIG. 2 shows a first example orientation of the level-sensing apparatus in which shoulder region 128 is above a top 202 of the lid 116 and the upper end 134 of the inner tube 122 (e.g., actuation device 138) is in operational relationship to the switch device 200. The orientation shown in FIG. 2 occurs when the upper surface 140 of the submerged solids 112 is above a predetermined low level. Note that, in addition to the switch device 200 providing an indication that the level of the submerged solids is above the predetermined low level, the level sensing apparatus also provides a visual indication in the length of the outer tube 120 visible above the top 202 of the lid 116.

In cases where the reservoir 100 and submerged solids 112 are associated with a water softener, each time the water softener regenerates the water 114 is pumped from reservoir 100 (the water softener and pump not shown so as not to unduly complicate the drawings). Thereafter, fresh water is pumped into the reservoir 100, and the fresh water dissolves a portion of the submerged solids 112 in the reservoir 100, the dissolving taking place until the water 114 reaches saturation. Dissolving of the submerged solids 112 causes the upper surface 140 of the submerged solids 112 to recede.

Figure 3:
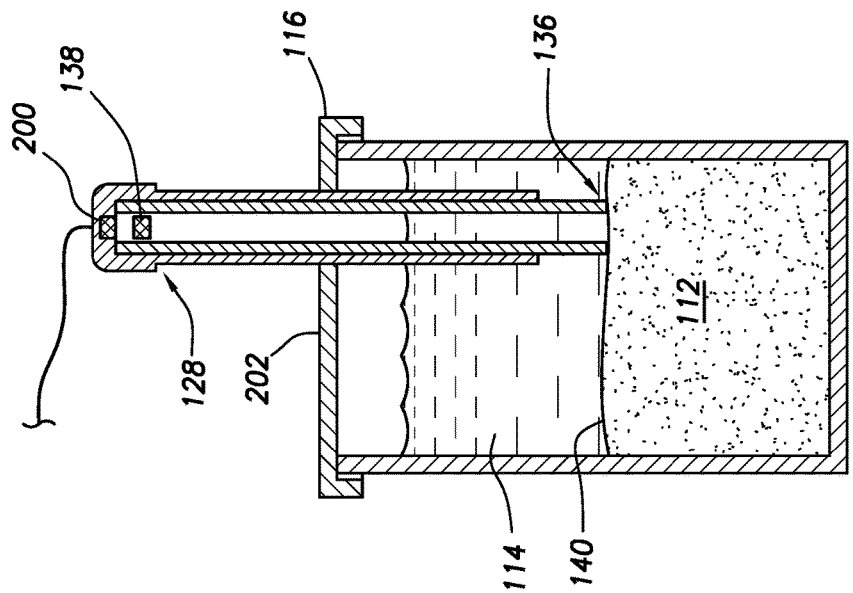
FIG. 3 shows a side elevation, cross-sectional, view of a level sensing system in accordance with at least some embodiments.

FIG. 3 shows a side elevation, cross-sectional, view of the level sensing system in accordance with at least some embodiments. In particular, FIG. 3 shows the system after one or more regeneration cycles where the upper surface 140 of the submerged solids 112 has receded from that shown in FIG. 1. As the level recedes (i.e., as the upper surface 140 recedes), the level sensing apparatus moves downward as shown in the juxtaposition of FIGS. 2 and 3. Inasmuch as the lower end 136 of inner tube 122 abuts the upper surface 140 of the submerged solids 112, the outer tube 120, the inner tube 122, and the switch device 200 all move downward together with the receding upper surface 140 of the submerged solids 112. Thus, the actuation device 138 remains in operational relationship to the switch device 200 in spite of the two tubes 120 and 122 changing in elevation relative to, for example, the top 202 of the lid 116.

At some point in the process, the upper surface 140 of the submerged solids 112 recedes to a predetermined low level. At the predetermined low level, the shoulder region 128 abuts the top 202 of the lid 116 as shown in FIG. 4. Thus, FIG. 4 shows a side elevation, cross-sectional, view of the level sensing system in accordance with at least some embodiments. In particular, when the upper surface 140 of the submerged solids 112 is at a predetermined low level 400, the shoulder region 128 abuts the top 202 of the lid 116. The abutting of the shoulder region 128 constrains further downward movement of the outer tube 120 (but not the further downward movement of the inner tube 122). Nevertheless, in the situation shown in FIG. 4 the upper end 134 of the inner tube 122 (in this case, the actuation device 138) is still in operational relationship to the switch device 200, and thus the notification system 132 has yet to receive an indication regarding the level of submerged solids 112 in the reservoir 100. The inner tube 122 is not constrained from further movement.

FIG. 5 shows a side elevation, cross-sectional, view of the level sensing system in accordance with at least some embodiments. In particular, in the example situation of FIG. 5 the upper surface 140 of the submerged solids 112 has fallen below the predetermined low level 400. Because the shoulder region 128 abuts the top 202 of the lid 116, the outer tube 120 is constrained from further downward movement. However, the inner tube 122 is not so constrained, and thus the outer tube 120 and inner tube 122 experience relative movement along the shared central axis as the upper surface 140 of the submerged solids 112 recedes. The relative movement of the outer tube 120 and inner tube 122 separate the actuation device 138 from the switch device 200, thus triggering a level alarm by the notification system 132 (FIG. 1). Stated slightly differently, in the view of FIG. 5 the level-sensing apparatus has a second orientation in which the shoulder region abuts the top 202 of the lid 116, the upper end 134 of the inner tube 122 is displaced from the switch device 200, and the switch device 200 is activated.

In example systems, the switch device 200 is a magnetic reed switch, and the actuation device 138 is a magnet. In this way the reed switch and magnet can be selected to provide a calibrated amount of relative travel before the reed switch actuates. For example, the reed switch and magnet may be selected to enable any value between 1 and 6 inches, inclusive, of relative travel between the outer tube 120 and the inner tube 122 before the reed switch actuates. Thus, relative movement between the outer tube 120 and the inner tube 122 less than the threshold may not activate the reed switch, which lowers the chances of the false low-level alarms prior to the shoulder region 128 abutting the top 202 of the lid 116. Other sensing systems with hysteresis in the actuation are possible. For example, the switch device 200 may be an optical system and the actuation device 138 a device that changes state of a light path (e.g., blocks light path). When the state of the light path for the optical device changes based on relative movement exceeding a predetermined threshold (e.g., three inches), the switch device 200 may provide an electrical or optical signal to another device to sound a low-level alarm. In yet still other cases, the switch device 200 may be an electromechanical switch (e.g., a mircoswitch device) with an actuation arm that contacts the upper end 134 of the inner tube 122. Thus, in such situations the actuation device 138 is the upper end 134 of the inner tube 122. As the outer tube 120 and inner tube 122 experience relative movement caused by the receding level of the submerged solids 112, the upper end 134 of the inner tube 122 separates from the electromechanical switch, causing a signal to propagate to the notification system 132.

Figure 6:
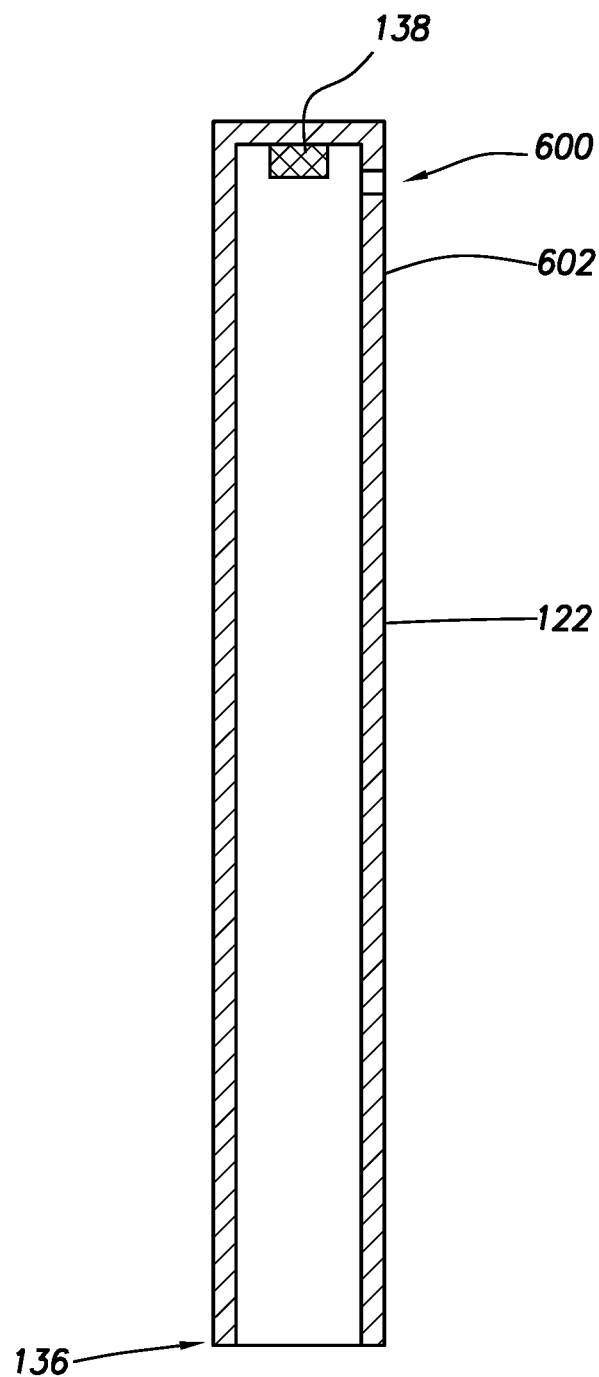
FIG. 6 shows a side elevation, cross-sectional, view of an inner tube in accordance with at least some embodiments.

FIG. 6 shows a side elevation, cross-sectional, view of an inner tube in accordance with at least some embodiments. In particular, in example embodiments the inner tube 122 has an open lower end 136 such that water within the reservoir 100 can flow into the interior volume of the inner tube 122. In order to reduce buoyant tendencies of the inner tube 122, air within the internal volume that would otherwise be trapped is allowed to escape by way of vent hole 600. The example vent hole 600 is shown through the side wall 602, but the vent hole 600 may be placed any suitable location to enable air to escape from the internal volume of the inner tube 122. In yet still other cases, the lower end 136 of the inner tube 122 may be closed or sealed to prevent water intrusion. In such cases, the inner tube 122 has sufficient density to be negatively buoyant.

The notification system 132 may take any suitable form. In some cases the notification system 132 is a standalone system to provide visual and/or audible alarms to indicate that the level of submerged solids has fallen below the predetermined low level. In other cases, the notification system 132 may be the overall plant control system within which the level sensing system is located, and to which the switch device 200 electronically provides (e.g., electrical and/or optical) signals indicative of the submerged solids having fallen below the predetermined low level.

Figure 7:
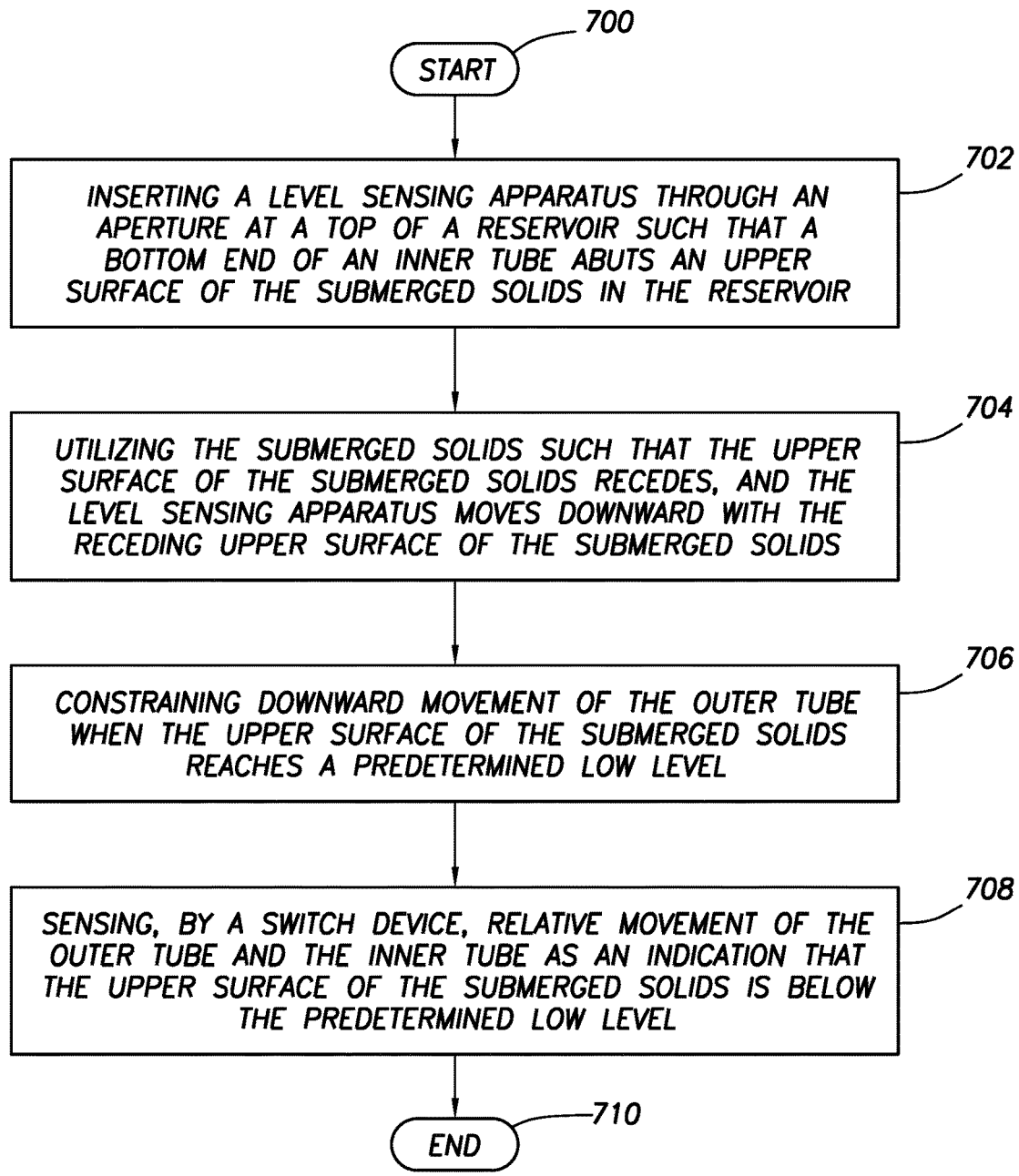
FIG. 7 shows a method in accordance with at least some embodiments.

FIG. 7 shows a method in accordance with at least some embodiments. In particular, the method starts (block 700) and comprises: inserting a level sensing apparatus through an aperture at a top of a reservoir such that a bottom end of an inner tube abuts an upper surface of the submerged solids in the reservoir (block 702); utilizing the submerged solids such that the upper surface of the submerged solids recedes, and the level sensing apparatus moves downward with the receding upper surface of the submerged solids (block 704); constraining downward movement of the outer tube when the upper surface of the submerged solids reaches a predetermined low level (block 706); and as the upper surface of the submerged solids continues to recede sensing, by the switch device, relative movement of the outer tube and an inner tube as an indication that the upper surface of the submerged solids is below the predetermined low level (block 708). Thereafter the method ends (block 710), likely to be restarted after replenishment of the submerged solids in the reservoir.

The above discussion is meant to be illustrative of the principles and various embodiments of the present invention. Numerous variations and modifications will become apparent to those skilled in the art once the above disclosure is fully appreciated. For example, the length L1 of the outer tube 120 is shown to be shorter than the length L2 of the inner tube 122; however, in some cases length L1 of the outer tube 120 is selected such that the second end 126 of the outer tube 120 and lower end 136 of the inner tube 122 both rest on the upper surface 140 of the submerged solids 112. Moreover, while the outer tube 120 is described to have a circular cross section (and thus the aperture 118 is a circular aperture), the outer tube 120 may have any suitable shape (e.g., square, octagonal, elliptical) and thus any suitable outside dimension, and in such cases the aperture 118 has a corresponding shape and corresponding inside dimension. Likewise, while the inner tube 122 is described to have a circular cross section (and thus the inside diameter of the outer tube 120 is circular), the inner tube 122 may have any suitable shape (e.g., square, octagonal, elliptical) and thus any suitable outside dimension, and in such cases the inside surface of the outer tube 120 has a corresponding shape and corresponding inside dimension. Moreover, the outside cross-sectional shapes of the outer tube and inner tube need not match. It is intended that the following claims be interpreted to embrace all such variations and modifications.

We claim:

1. An apparatus for monitoring a level of submerged solids in a reservoir, comprising:
    a retention device disposed at an upper end of the reservoir, the retention device defines a top and an aperture with an inside dimension;
    an outer tube that defines a first end and a second end opposite the first end, the outer tube defines a shoulder region between a first outside dimension of the outer tube and a second outside dimension of the outer tube, the first outside dimension smaller than the inside dimension of the aperture, and the second outside dimension greater than the first outside dimension and the inside dimension of the aperture;
    an inner tube that defines an upper end, a lower end, and length between the upper and lower ends, wherein the lower end of the inner tube configured to abut an upper surface of the submerged solids;
    the inner tube telescoped within the outer tube, and the inner tube and outer tube telescoped through the aperture; and
    a switch device disposed at the first end of said outer tube;
    the apparatus has a first orientation in which the shoulder region is above the top of the retention device and the upper end of the inner tube is in operational relationship to the switch device, when an upper surface of the submerged solids is above a predetermined low level, and
    the apparatus has a second orientation in which the shoulder region abuts the top of the retention device, the upper end of the inner tube is displaced from the switch device, and the switch device is activated, when the upper surface is below the predetermined low level.

2. The apparatus of claim 1 further comprising a notification system electrically coupled to the switch device, the notification system configured to at least one selected from a group consisting of: sound an audible alarm; activate a visual alarm; and electronically send a notification to a control system.

3. The apparatus of claim 1 wherein the outer tube includes a cap, the cap defines the shoulder region.

4. The apparatus of claim 3 wherein the switch device is enclosed within said cap.

5. The apparatus of claim 1 wherein the switch device is a magnetic reed switch.

6. The apparatus of claim 5 further comprising a magnet disposed at the upper end of the inner tube.

7. The apparatus of claim 1 further comprising a vent hole at the upper end of the inner tube.

8. The apparatus of claim 1 wherein the retention device is a lid that occludes an upper end of the reservoir, and the aperture defined through the lid.

9. The apparatus of claim 1 wherein the outer tube defines a circular cross-sectional shape, and the aperture of the retention device defines a circular cross-sectional shape.

10. The apparatus of claim 1 wherein the inner tube defines a circular cross-sectional shape, and the inside surface of the outer tube defines a circular cross-sectional shape.

11. In a system with a level sensing apparatus comprising an outer tube with a switch device disposed at a first end of the outer tube, a shoulder defined at an upper end of the outer tube, and an inner tube telescoped within the outer tube with an upper end of the inner tube in operational relationship to the switch device, a process for monitoring the level of submerged solids in a reservoir, comprising:
    inserting the level sensing apparatus through an aperture at a top of the reservoir such that a bottom end of the inner tube abuts an upper surface of the submerged solids in the reservoir;
    utilizing the submerged solids such that the upper surface of the submerged solids recedes, the level sensing apparatus moves downward with the receding upper surface of the submerged solids;
    constraining downward movement of the outer tube by way of the shoulder when the upper surface of the submerged solids reaches a predetermined low level; and as the upper surface of the submerged solids continues to recede
    sensing, by the switch device, relative movement of the outer tube and an inner tube as an indication that the upper surface of the submerged solids is below the predetermined low level.

12. The process of claim 11 further comprising sounding an alarm when the upper surface of the submerged solids is below the predetermined low level.

13. The process of claim 11 wherein constraining further downward movement of the outer tube further comprising limiting downward movement of the outer tube by a shoulder region defined on an exterior surface of the outer tube.

14. The process of claim 11 wherein the switch device comprises a reed switch, and wherein sensing relative movement further comprises actuating the reed switch by movement of a magnet disposed at the upper end of the inner tube.

15. A system comprising:
    a tank configured to hold salt pellets and water within an interior volume of the tank, the tank having side walls, a closed bottom, and an upper aperture into the interior volume;
    a lid with an aperture disposed over the tank;
    a level sensing apparatus telescoped through the aperture of the lid, the level sensing apparatus comprising:
        a first tube having a first end with a first outside diameter, a second end with a second outside diameter smaller than the first outside diameter, a shoulder defined at an intersection of the first and second outside diameters, and an inside diameter, the first outside diameter greater than an inside diameter of the aperture through the lid, and the second outside diameter smaller than the inside diameter of the aperture through the lid;
        a switch device disposed at the first end of the first tube;
        a second tube having an upper end, a lower end, and an outside diameter, the outside diameter of the second tube less than the inside diameter of the first tube;
        an actuation device disposed at the upper end of the second tube;
        the second tube telescoped within the first tube;
        the second tube configured to abut an upper surface of the salt level within the tank, and as salt is dissolved and the upper surface recedes, the first tube, second tube, and switch device move downwardly relative to the aperture through the aperture of the lid; and
        the shoulder configured to abut an upper surface of the lid and constrain the first tube against further downward movement when the salt level within the tank reaches a predetermined low level, and the second tube configured to continue downward travel after the shoulder abuts the upper surface of the lid; and
        when the second tube moves a predetermined distance relative to the first tube, the switch device is activated by the actuation device.

16. The system of claim 15 wherein the switch device is a magnetic reed switch, and the actuation device is a magnet.

17. The system of claim 15 wherein both the lower end of the inner tube and the second end of the outer tube abut the upper surface of the salt level.

* * * * *